UNITED STATES PATENT OFFICE.

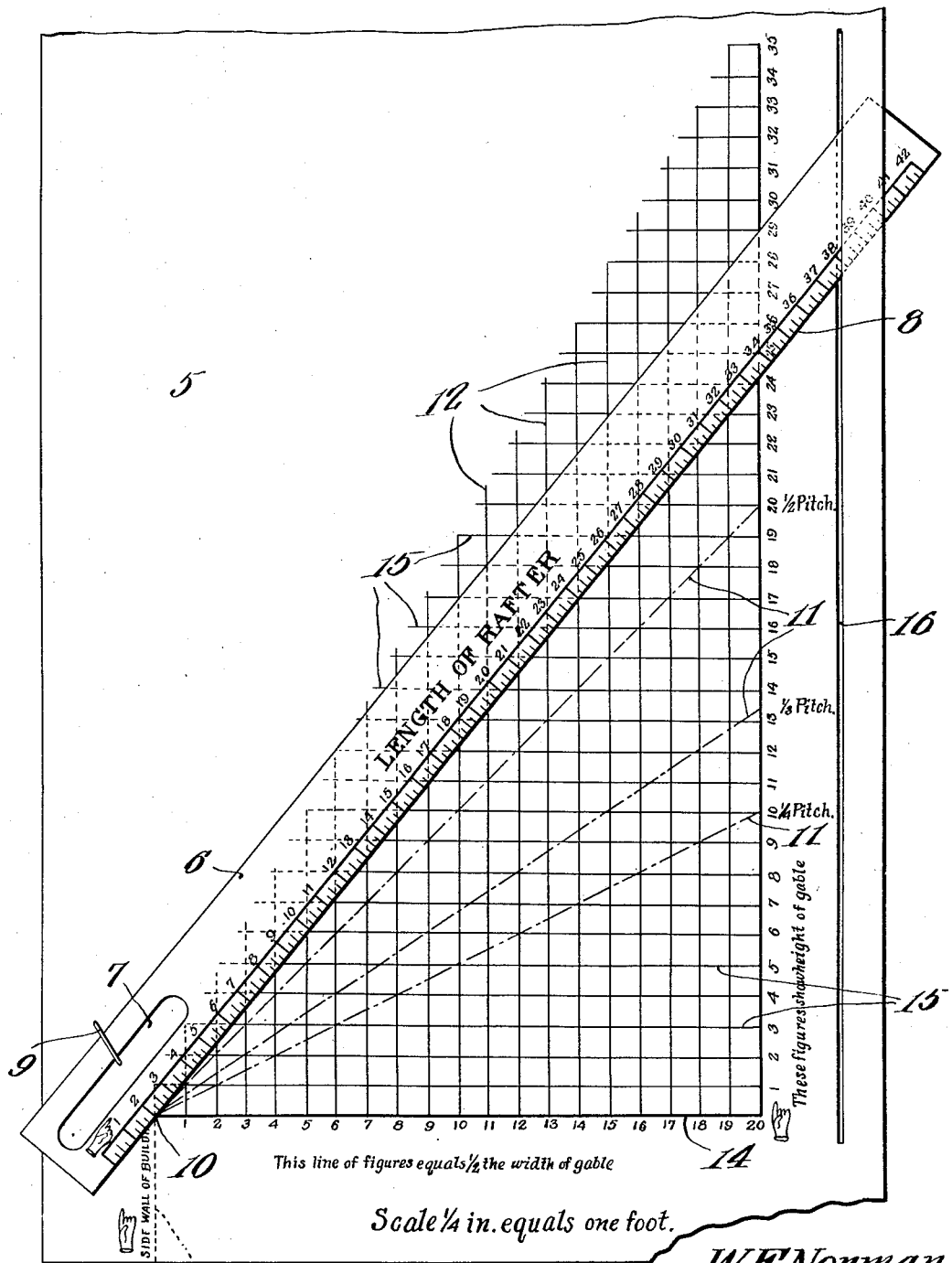

WILLIAM F. NORMAN, OF NEVADA, MISSOURI.

RAFTER-RECKONER.

1,056,206.  Specification of Letters Patent.  Patented Mar. 18, 1913.

Application filed March 26, 1912. Serial No. 686,372.

*To all whom it may concern:*

Be it known that I, WILLIAM F. NORMAN, a citizen of the United States, residing at Nevada, in the county of Vernon and State of Missouri, have invented a new and useful Rafter-Reckoner, of which the following is a specification.

This invention relates to instruments for reckoning or determining the length of rafters for various pitches of roofs in gable constructions and has for its object to provide an improved device of this character which will be simple in construction and operation and accurate in its computations.

A further object is to provide a device of this character which cannot only be used to determine the length of the rafter from the eaves to the ridge but also in addition thereto to make allowance for the projection thereof over the eaves.

With the above and other objects in view the invention is embodied in the novel construction, arrangement and combination of parts as hereinafter described and as illustrated in the accompanying drawings, wherein similar reference characters indicate similar parts, and wherein the device is shown in plan.

Referring specifically to the drawings, 5 indicates a suitable base board, preferably rectangular in shape, and is of suitable material, such as paper, wood, aluminum or the like. A longitudinal or perpendicular line 13 at one side of the board 5 represents the side wall of the building and a lateral or horizontal line 14 at a right angle with the former line represents the base of the gable, the corner 10 formed by the intersection of the said lines representing the eave of the gable. A plurality of graduated longitudinal lines 12 parallel with the line 13 extend from the line 14 to represent the various perpendicular lines at points from the eaves, and a plurality of graduated parallel lines 15 are arranged in steps from the line 14 representing the various heights of gables. The lines 12 and 15 are spaced according to a suitable scale per foot and are numbered consecutively from the respective lines 13 and 14 to represent feet or other linear measurement.

A scale arm 6 is slidably pivoted to the base board at a point adjacent the corner 10 to bring one edge thereof on the corner 10 which edge has a scale of graduations 8 thereon commencing at the said end and corresponding with the scales of the lines 12 and 15. The particular means as shown for slidably pivoting the scale arm to the base board comprises a wire clip or staple 9 which is passed through an elongated longitudinal slot 7 in the end of the scale arm and over the ungraduated edge thereof to engage the base board. The clip or staple 9 permits the scale arm to be shifted one way or the other as the scale arm is swung on the base board to bring the graduated edge thereof on the corner 10 at all times. It is to be understood, however, that this means for pivoting the scale arm can be altered in its details.

Several guide lines 11 are drawn from the corner 10 diagonally over the lines 12 and 15 to indicate the ordinary pitches of roofs in common use. As shown, these lines 11 represent respectively one-quarter, one-third and one-half pitches.

The base board 5 has a longitudinal slit 16 therein at the side opposite the line 13 and the free end of the scale arm 6 passes through the slit for retaining the free end of the scale arm on the base board and for frictionally retaining the scale arm in any position to which it is swung.

In use, to determine the length of an ordinary rafter the scale arm 6 is slid upon the base board to bring the numeral designating the amount of eaves projection of the rafter on the corner 10, and the scale arm is then swung to bring the graduated edge thereof over the point of intersection of the horizontal line 15 representing the height of the gable being calculated and the vertical line 12 representing the perpendicular dropped from the ridge of the gable, in which event the length of the rafter is designated on the scale arm by the point of intersection of the said lines 12 and 15. For example, supposing the distance from the side of the building to the perpendicular dropped from the ridge of the gable is 14 feet, the height of the supposed gable is 17 feet, and the eaves projection is 2 feet. The scale arm is then slid to bring the graduation indicating 2 feet on the corner 10 and by swinging the scale arm to pass over the intersection of the line 12, numbered 14, and the line 15, numbered 17. The length of the rafter will be designated on the scale arm by the said point of intersection, which in this case is approximately 24 feet.

To determine the length of a hip or valley rafter, the same method is followed, using the length of the ordinary rafter without eaves projection in lieu of the height of the gable, and allowing a few inches extra for the additional projection over the eaves. For example, using the former dimensions, to find the length of a hip or valley rafter to be used in connection therewith, the graduation of the scale arm indicating 2 feet plus the additional eaves projection, say 6 inches, or the graduation indicating 2 feet and six inches is brought on the corner 10 and the scale arm is then swung to pass over the point of intersection of the horizontal line marked 22 (the length of the common rafter minus the eaves projection) and the perpendicular line designated 14. Then the length of the hip or valley rafter will be designated on the graduations of the scale arm by the point of intersection, in this case approximately 28 feet and nine inches.

When either the height of the gable or the distance from the perpendicular dropped from the gable to the side wall of the building is of an odd dimension so as not to fall upon any of the respective lines 12 and 15, the device is used in the manner described by using an imaginary line, in which event the intersection of either of the lines 12 and 15 with the imaginary line will indicate the length of the rafter on the scale arm 6. Should both the height of the gable and the distance from the perpendicular dropped from the gable to the side wall of the building be of uneven dimensions the imaginary intersection of the imaginary lines indicating the height of the gable and the perpendicular dropped from the gable will indicate the length of the rafter on the scale arm. It is understood that this device may therefore be used for various dimensions, as will be apparent and that the lines 12 and 15 serve primarily as guide lines, and will enable the person using the device to determine the length of ordinary rafters, hip or valley rafters, jack rafters and the like.

In this manner this device will be found useful by lumbermen and carpenters to quickly ascertain what length of material must be purchased, and this device provides a convenient and efficient means for reckoning or determining the length of ordinary rafters, hip or valley rafters, jack rafters and the like.

What is claimed as new is:—

1. An instrument of the character described, comprising a base board having lines at right angles thereon representing the side wall of a building and base of the gable respectively and a plurality of lines commencing with each of the said lines to represent the respective distances from the eaves and heights of gables, and a scale arm having a scale of graduations along one edge to correspond with the scale of the said lines on the board which is operatively connected to the board to slide and swing over the board so that the graduated edge thereof may be shifted on the corner of the first mentioned lines.

2. An instrument of the character described comprising a base board having lines at right angles thereon representing the side wall of the building and base of the gable respectively and a plurality of lines commencing with each of the said lines to represent the respective distances from the eaves and heights of gables, and a scale arm having a scale or graduations along one edge to correspond with the scale of the said lines on the board which is slidably and pivotally connected to the base board so that it may be shifted on the base board to bring the graduated edge thereof on the corner of the first mentioned lines, the base board having a slot therein opposite the line representing the side wall of the building and through which slot the free end of the scale arm is passed.

3. An instrument of the character described, comprising a base board having lines at right angles thereon representing respectively the side wall of a building and the base of the gable and a plurality of lines commencing with each of the said lines to represent the respective distances from the eaves and heights of the gables, a scale arm having a scale of graduations along one edge to correspond with the scale of the said lines on the board and having a slot in one end, and a member passed through the said slot and engaging the board adjacent the corner of the first mentioned lines, whereby the scale arm may be slid and swung on the base board and shifted to bring the graduated edge on the said corner.

In testimony that I claim the foregoing as my own, I have hereto affixed my signature in the presence of two witnesses.

WILLIAM F. NORMAN.

Witnesses:
MAX C. STERETT,
W. M. ODELL.